United States Patent
Kalantzis et al.

(10) Patent No.: US 11,907,715 B2
(45) Date of Patent: Feb. 20, 2024

(54) HARDWARE ACCELERATION WITH PRECONDITIONERS

(71) Applicant: International Business Machines Corporation, Armonk, NY (US)

(72) Inventors: Vasileios Kalantzis, White Plains, NY (US); Lior Horesh, North Salem, NY (US); Shashanka Ubaru, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 17/556,252

(22) Filed: Dec. 20, 2021

(65) Prior Publication Data

US 2023/0195457 A1 Jun. 22, 2023

(51) Int. Cl.
*G06F 9/30* (2018.01)
*G06F 17/16* (2006.01)

(52) U.S. Cl.
CPC ........ *G06F 9/30036* (2013.01); *G06F 9/3001* (2013.01); *G06F 17/16* (2013.01)

(58) Field of Classification Search
CPC ..... G06F 9/30036; G06F 9/3001; G06F 17/16
See application file for complete search history.

(56) References Cited

U.S. PATENT DOCUMENTS

| | | | | |
|---|---|---|---|---|
| 5,559,519 A | * | 9/1996 | Fenner | G01S 7/032 342/174 |
| 6,064,808 A | * | 5/2000 | Kapur | G06F 30/367 703/2 |
| 8,745,563 B2 | | 6/2014 | Jain et al. | |
| 8,913,821 B1 | | 12/2014 | Agarwal et al. | |
| 9,424,232 B2 | | 8/2016 | Bekas et al. | |
| 10,209,685 B2 | | 2/2019 | Kniazev et al. | |

(Continued)

FOREIGN PATENT DOCUMENTS

| | | |
|---|---|---|
| CN | 111507464 A | 8/2020 |
| EP | 1205850 A2 | 5/2002 |

OTHER PUBLICATIONS

Haron et al, "Parallel Matrix Multiplication on Memristor-Based Computation-in-Memory Architecture" (Year: 2016).*

(Continued)

*Primary Examiner* — Farley Abad
(74) *Attorney, Agent, or Firm* — Erik Johnson; Ryan, Mason & Lewis, LLP

(57) ABSTRACT

Techniques are provided to implement hardware accelerated application of preconditioners to solve linear equations. For example, a system includes a processor, and a resistive processing unit coupled to the processor. The resistive processing unit includes an array of cells which include respective resistive devices, wherein at least a portion of the resistive devices are tunable to encode entries of a preconditioning matrix which is storable in the array of cells. When the preconditioning matrix is stored in the array of cells, the processor is configured to apply the preconditioning matrix to a plurality of residual vectors by executing a process which includes performing analog matrix-vector multiplication operations on the preconditioning matrix and respective ones of the plurality of residual vectors to generate a plurality of output vectors used in one or more subsequent operations.

20 Claims, 10 Drawing Sheets

(56) References Cited

U.S. PATENT DOCUMENTS

| | | | |
|---|---|---|---|
| 10,241,971 B2 | 3/2019 | Muralimanohar | |
| 10,366,344 B1* | 7/2019 | Vasiloglou | G06N 20/10 |
| 2009/0248778 A1* | 10/2009 | Magerlein | G06F 17/16 |
| | | | 708/520 |
| 2014/0146757 A1* | 5/2014 | Han | H04L 25/0224 |
| | | | 370/329 |
| 2015/0234781 A1 | 8/2015 | Angerer et al. | |
| 2019/0356394 A1* | 11/2019 | Bunandar | H04B 10/548 |
| 2023/0145125 A1* | 5/2023 | Oyama | G06F 9/3893 |
| | | | 708/520 |

OTHER PUBLICATIONS

Grote et al, "Parallel Preconditioning with Sparse Approximate Inverses" (Year: 1995).*

M. Benzi et al., "A Comparative Study of Sparse Approximate Inverse Preconditioners," Applied Numerical Mathematics, vol. 30, 1999, pp. 305-340.

M. J. Grote et al., "Parallel Preconditioning with Sparse Approximate Inverses." SIAM Journal on Scientific Computing, Jan. 1996, pp. 1-25.

A. Haron et al., "Parallel Matrix Multiplication on Memristor-Based Computation-in-Memory Architecture." 2016 International Conference on High Performance Computing and Simulation, IEEE, 2016, 8 pages.

Q.-Y. Dou et al., "Multi-level Preconditioned Block Accelerated Overrelaxation Iteration Method for z-Matrices," Journal of Applied Mathematics & Computing, vol. 38, No. 1-2, 2012, pp. 653-667.

A. Shafiee et al., "ISAAC: A Convolutional Neural Network Accelerator with In-Situ Analog Arithmetic in Crossbars," 2016 ACM/IEEE 43rd Annual International Symposium on Computer Architecture, Oct. 5, 2016, 13 pages.

P. Mell et al., "The NIST Definition of Cloud Computing," Recommendations of the National Institute of Standards and Technology, Special Publication 800-145, Sep. 2011, 7 pages.

Wikipedia, "Augmented Matrix," https://en.wikipedia.org/w/index.php?title=Augmented_matrix&oldid=1027621959, Jun. 9, 2021, 4 pages.

Wikipedia, "Preconditioner," https://en.wikipedia.org/w/index.php?title=Preconditioner&oldid=1051939750, Oct. 26, 2021, 9 pages.

Wikipedia, "Non-negative Least Squares," https://en.wikipedia.org/w/index.php?title=Non-negative_least_squares&oldid=1055556815, Nov. 16, 2021, 3 pages.

U.S. Appl. No. 17/134,814 filed in the name of Tayfun Gokmen et al., filed Dec. 28, 2020, and entitled "Matrix Inversion Using Analog Resistive Crossbar Array Hardware."

* cited by examiner

702

701

800

HARDWARE ACCELERATION WITH PRECONDITIONERS

BACKGROUND

This disclosure relates generally to analog resistive processing systems for neuromorphic computing, and techniques for performing hardware accelerated numerical computing tasks using an analog resistive processing system. Information processing systems such as neuromorphic computing systems and artificial neural network systems are utilized in various applications such as machine learning and inference processing for cognitive recognition and computing. Such systems are hardware-based systems that generally include a large number of highly interconnected processing elements (referred to as "artificial neurons") which operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of resistive processing unit (RPU) cells having tunable resistive memory devices (e.g., tunable conductance), wherein conductance states of the RPU cells are encoded or otherwise mapped to the synaptic weights.

SUMMARY

Exemplary embodiments of the disclosure include systems, computer program products, and methods to implement hardware accelerated application of preconditioners to solve linear equations. In an exemplary embodiment, a system comprises a processor, and a resistive processing unit (RPU) coupled to the processor. The resistive processing unit comprises an array of cells which respectively comprise resistive devices, wherein at least a portion of the resistive devices are tunable to encode the entries of a preconditioning matrix storable in the array of cells. When the preconditioning matrix is stored in the array of cells, the processor is configured to apply the preconditioning matrix to a plurality of residual vectors by executing a process which comprises performing analog matrix-vector multiplication operations on the preconditioning matrix and respective ones of the plurality of residual vectors to generate a plurality of output vectors used in one or more subsequent operations.

Other embodiments will be described in the following detailed description of exemplary embodiments, which is to be read in conjunction with the accompanying figures.

DETAILED DESCRIPTION

Embodiments of the invention will now be described in further detail with regard to systems and methods for providing hardware accelerated application of preconditioners to solve linear equations. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration". Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., ASICs, FPGAs, etc.), processing devices (e.g., CPUs, GPUs, etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
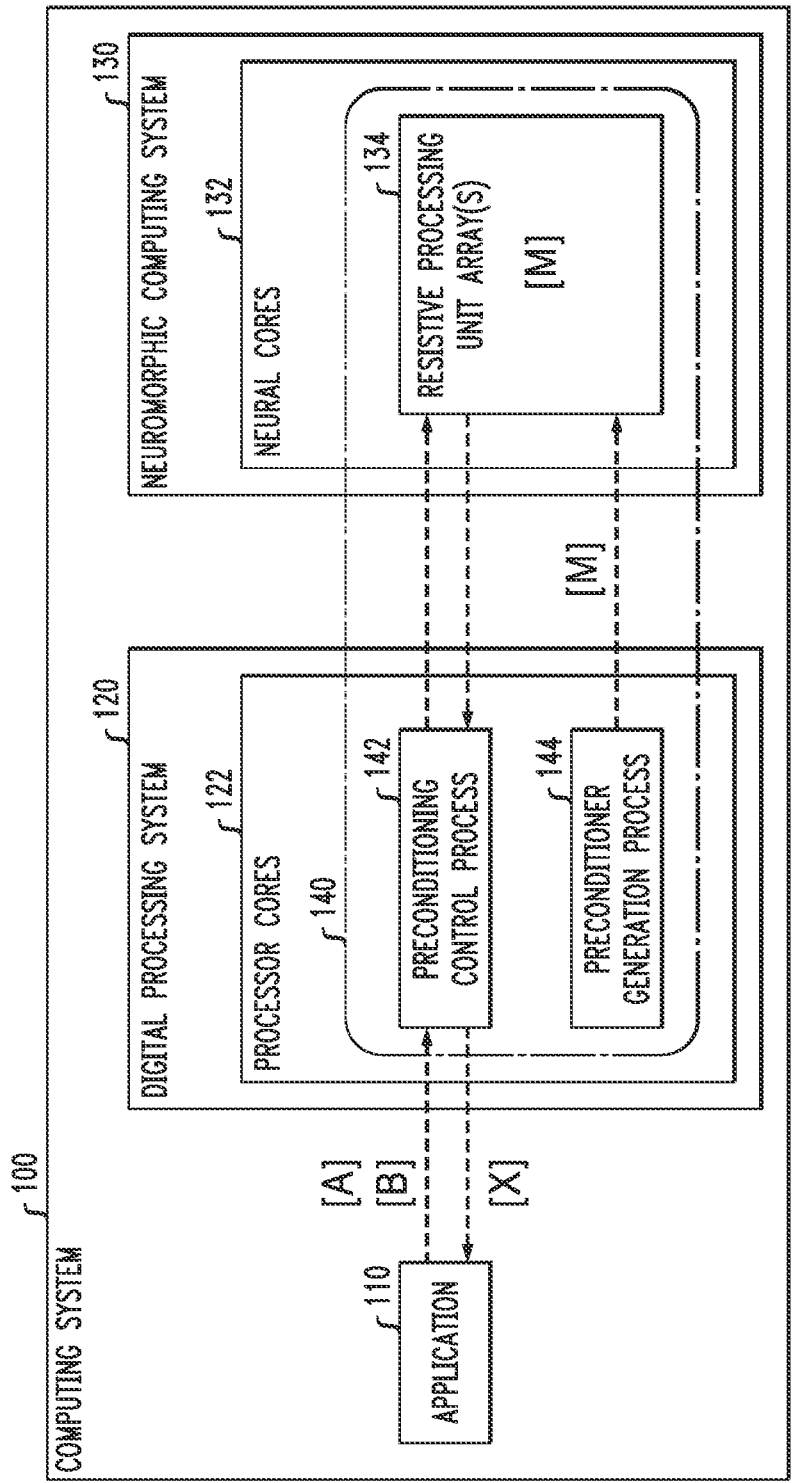
FIG. 1 schematically illustrates a computing system which implements hardware accelerated application of preconditioners to solve linear equations, according to an exemplary embodiment of the disclosure.

FIG. 1 schematically illustrates a computing system which implements hardware accelerated application of preconditioners to solve linear equations, according to an exemplary embodiment of the disclosure. In particular, FIG. 1 schematically illustrates a computing system 100 which comprises an application 110, a digital processing system 120, and a neuromorphic computing system 130. The digital processing system 120 comprises a plurality of processor cores 122. The neuromorphic computing system 130 comprises a plurality of neural cores 132. In some embodiments, the neuromorphic computing system 130 comprises a resistive processing unit (RPU) system in which each neural core 132 comprises one or more analog resistive processing unit arrays (e.g., analog RPU crossbar array hardware). The neural cores 132 are configured to support hardware acceleration for performing matrix operations such as using a preconditioning matrix (also referred to herein as a "preconditioner") to solve linear systems, etc., by performing multiply-accumulate (MAC) operations in the analog domain to support hardware acceleration of numerical operations such as vector-matrix multiplication, matrix-vector multiplication, vector-vector multiplication, and/or matrix multiplication operations, which are performed on the RPU arrays 134.

In some embodiments, the digital processing system 120 controls the execution of matrix operations such as the application of a preconditioner which is performed to solve a linear system (e.g., AX=B) given matrices A and B provided by the application 110. The preconditioner application process 140 involves various processes and optimization solver methods to enable the application of a preconditioning matrix M to a plurality of residual vectors to solve the linear system. The matrix M comprises an approximate inverse of the matrix A ($A^{-1}$). In some embodiments, the preconditioner application process 140 implements a preconditioning control process 142, and a preconditioner generation process 144, which are utilized by the preconditioner application process 140 to compute approximate solutions $x_i$ to the linear system. In some embodiments, the preconditioning control process 142 and the preconditioner generation process 144 are software modules that are executed by the processor cores 122 of the digital processing system 120 to perform the preconditioner application process 140. As explained in further detail below, the preconditioner application process 140 utilizes the neuromorphic computing system 130 to perform hardware accelerated multiply-accumulate (MAC) operations in the analog domain through various in-memory computations, such as matrix-vector operations on a preconditioning matrix (e.g., matrix M(approximate (estimated) inverse matrix $A^{-1}$)) which is stored in one or more of the RPU arrays 134, as schematically illustrated in FIG. 1.

The application 110 may comprise any type of computing application (e.g., scientific computing application, engineering application, graphics rendering application, signal processing application, facial recognition application, matrix diagonalization applications, a MIMO (Multiple-Input, Multiple-Output) system for wireless communications, cryptography, etc.) which utilizes matrices and inverse matrices as computational objects to perform numerical operations, to solve linear equations, and perform other computations.

Mathematically, a linear system (or system of linear equations) is a collection of one or more linear equations that have the same set of variables, wherein a solution to the linear system involves assigning values to the variables such that all linear equations (of the linear system) are simultaneously satisfied. In mathematics, the theory of linear systems is the basis and a fundamental part of numerical linear algebra, which involves utilizing properties of vectors and matrices and associated vector/matrix operations to implement computer algorithms to solve linear systems in an efficient an accurate manner. Common problems in numerical linear algebra include obtaining matrix decompositions such as singular value decomposition, matrix diagonalization, etc., and establishing and applying preconditioners which can be utilized to solve common linear algebraic problems such as solving liner systems of equations.

For example, a linear system of equations with constant coefficients can be solved using an algebraic method in which a matrix M is used as a preconditioner and an iterative process is utilized to determine output vectors used in one or more operations to return a plurality of iterative solutions to a linear system. More specifically, a linear system of equations can be represented in the form of the following equation:

$$AX=B \qquad \text{(Eqn. 1)}$$

where A is a given n×n matrix of real or complex numbers, X is a variable n×p matrix of real or complex numbers and B is a given n×p matrix of real or complex numbers. For example, the embodiments provide techniques for processing multiple linear systems of equations and computing a matrix $X \in R^{n \times p}$ that satisfies the system of linear equations AX=B for a non-singular matrix $A \in R^{n \times p}$ and a right-hand side matrix $B \in R^{n \times p}$. A non-singular matrix refers to a square matrix that has an inverse. AX=B can be represented as follows:

$$\begin{bmatrix} a_{11} & a_{12} & \cdots & a_{1n} \\ a_{21} & a_{22} & \cdots & a_{2n} \\ \vdots & \vdots & \ddots & \vdots \\ a_{n1} & a_{a2} & \cdots & a_{nn} \end{bmatrix} \begin{bmatrix} x_{11} & \cdots & x_{1p} \\ x_{21} & \cdots & x_{2p} \\ \vdots & \ddots & \vdots \\ x_{n1} & \cdots & x_{np} \end{bmatrix} = \begin{bmatrix} b_{11} & \cdots & b_{1p} \\ b_{21} & \cdots & b_{2p} \\ \vdots & \ddots & \vdots \\ b_{n1} & \cdots & b_{np} \end{bmatrix}$$

In some conventional approaches, Gaussian elimination is used to solve for X by factorizing matrix A into lower and upper triangular matrices L and U in the form of A=LU. The solution is computed as $X=A^{-1}B=U^{-1}L^{-1}B$. This standard approach can be inefficient both in terms of execution complexity (e.g., up to $O(n^3)$) and memory requirements (e.g., up to $O(n^2)$), as the lower and upper triangular matrices L and U can be extremely dense, and may not be stored in memory.

In accordance with the embodiments, linear systems are solved by applying an iterative procedure with a preconditioning matrix M. For example, the linear system AX=B is rewritten in condensed form as the following equation:

$$Ax=b \qquad \text{(Eqn. 2)}$$

where A is a given n×n matrix of real or complex numbers, x is a variable non-zero vector comprising real or complex numbers, and b is a given non-zero vector comprising real or complex numbers. In more detail, the matrix system $A[x^{(1)} \ldots x^{(s)}]=[b^{(1)} \ldots b^{(s)}]$ can be solved by applying an iterative procedure p different times; one for each system $Ax^{(i)}=b^{(i)}$, i=1, ..., p.

According to the embodiments, the system of linear equations is solved with matrix-vector multiplication using an approximate inverse preconditioner M A'. The system of linear equations is solved with matrix-vector multiplication according to the following equation:

$$MA[x^{(1)} \ldots x^{(s)}] = M[b^{(1)} \ldots b^{(s)}] \quad \text{(Eqn. 3)}$$

Applying the preconditioner M is equivalent to matrix-vector multiplication with matrix M. Approximate inverse preconditioners can be effective, but are also orders of magnitude denser than matrix A, especially when the matrix A is sparse. A sparse matrix refers to a matrix having mostly zero entries, while a dense matrix refers to a matrix having mostly non-zero entries. In a non-limiting illustrative example, assuming the use of matrix M reduces the number of iterations by 5 times, the number of non-zero (nnz) entries in matrix M may be 10 times more than that of matrix A (e.g., nnz(M)=10×nnz(A)). As a result, an iterative solution using matrix M may require relatively long execution times.

In an effort to address these concerns, the embodiments provide techniques for hardware accelerated application of preconditioners to solve linear equations in which preconditioning is performed by one or more analog RPU arrays (e.g., analog RPU crossbar array hardware) such as, for example, memristor crossbar arrays. The arrays perform matrix-vector multiplication operations using only a fraction of energy consumption and time compared to that when digital devices are used.

For example, a portion of the following algorithm is performed by the one or more analog RPU arrays:
1: input: $A \in C^{n \times n}$, $M \in C^{n \times n}$, $b \in C^n$, $\tau \in R$, $m_{it} \in N$, $x_0 \in C^n$
2: Set $r_0 = b - Ax_0$, $Z_0 = 0$
3: for i=1 to $m_{it}$ do
4: $Z_i = [Z_{i-1}, Mr_{i-1}]$
5: Solve $(Z_i^H A Z_i) y = Z_i^H b$
6: Set $x_i = Z_i y$
7: $r_i = b - Ax_i$
8: If $\|r_i\|_2 \leq \tau \|b\|$; exit;
9: end for
10: return approximate solution $x_i$ More specifically, according to one or more embodiments, the processing in at least step 4 above is performed by the one or more analog RPU arrays. Given an input of an n×n matrix A for the set of complex numbers, the preconditioner generation process 144 generates an approximate inverse matrix $A^-$ of the matrix A (i.e., pre-conditioner matrix M) comprising a set of complex numbers. As schematically illustrated in FIG. 1, the preconditioner generation process 144 implements methods that are configured to compute an estimate inverse matrix $A^-$ of the matrix A provided by the application 110, and store the estimated inverse matrix $A^-$ (i.e., pre-conditioner matrix M) in the RPU array(s) 134. The preconditioning control process 142 will apply the preconditioning matrix M to a plurality of residual vectors r by performing analog matrix-vector multiplication operations on the preconditioning matrix M and respective ones of the plurality of residual vectors to generate a plurality of output vectors used in one or more subsequent operations to return a plurality of iterative solutions $x_i$ to the linear system Ax b. In some embodiments, the preconditioner generation process 144 is performed in the digital domain using any suitable process to compute an estimate of the inverse matrix $A^-$ of the matrix A. For example, in some embodiments, the preconditioner generation process 144 is implemented using a Neuman series process, an incomplete LU factorization process and/or a Newton iteration process to compute an approximation of the inverse matrix A', exemplary methods of which are known to those of ordinary skill in the art, the details of which are not needed to understand the exemplary preconditioner application techniques as described herein.

In some embodiments, the preconditioner generation process 144 implements the hardware acceleration computing techniques as disclosed in U.S. patent application Ser. No. 17/134,814, filed on Dec. 29, 2020, entitled: "Matrix Inversion Using Analog Resistive Crossbar Array Hardware," which is commonly assigned and fully incorporated herein by reference. U.S. patent application Ser. No. 17/134,814 discloses techniques to perform a matrix inversion process which comprises, e.g., (i) storing a first estimated inverse matrix of the given matrix A in one or more of the RPU array(s) 134, and (ii) performing a first iterative process on the first estimated inverse matrix stored in the array of RPU cells to converge the first estimated inverse matrix to a second estimated inverse matrix of the given matrix. In some embodiments, the first iterative process comprises a stochastic gradient descent optimization process which comprises utilizing row vectors of the given matrix A as training data to train the first estimated inverse matrix stored in the array of RPU cells and update matrix entries of the first estimated inverse matrix stored in the array of RPU cells by utilizing error vectors that are determined based on matrix entries of an identity matrix. Further details of the matrix inversion process flow are described in the U.S. patent application Ser. No. 17/134,814, which is incorporated herein by reference.

As shown in step 1 above, in addition to the matrix A, additional inputs which can be received by the preconditioning control process 142 from the application 110 include a set of complex numbers for the vector b, a tolerance $\tau$, a maximum number of iterations $m_{it}$ and an initial factor vector $x_0$. The tolerance $\tau$ is taken from the set of real numbers and specifies an error limit for a resulting solution vector so that when a convergence check operation is performed, it can be determined if a current resulting solution vector has converged to the solution x within a given tolerance. For example, the tolerance $\tau$ can specify the level of error (e.g., $\pm 10^{-5}$, $10^{-6}$, etc.) of a returned result. The maximum number of iterations $m_{it}$ is taken from the set of natural numbers and specifies a threshold number of iterations to be performed before a solution is accepted. If a convergence criterion is met before reaching the maximum number of iterations $m_{it}$, then the solution meeting the convergence criterion is accepted. If a convergence criterion is not met before reaching the maximum number of iterations $m_{it}$, then the solution after the iteration corresponding to the maximum number is accepted. An initial factor vector $x_0$ is taken from the set of complex numbers and specifies an initial approximation of the solution x, and can be, for example, 0.

Referring to step 2 in the algorithm above, a residual vector for Ax=b is set to $r_0 = b - Ax_0$. A unique solution to Ax=b occurs if the residual vector r=b−Ax satisfies r=0. The computed approximation to x for each iteration is $r_i = b - Ax_i$. At step 2, an initial matrix $Z_0$ is empty, and is represented as $Z_0 = 0$. Referring to step 3, for i=1 to $m_{it}$, the preconditioner application process 140 utilizing the preconditioning control process 142 and/or the RPU array(s) 134 of the neural cores 132 perform the subsequent steps 4-10. As noted above, the processing in at least step 4 above is performed by the one or more analog RPU arrays 134. In step 4, the RPU array(s) 134 perform a matrix-vector multiplication operation on the preconditioning matrix M and a given or previous residual vector $r_{i-1}$ to generate an output vector (e.g., a column vector), which is combined with the matrix $Z_{i-1}$ to generate an augmented matrix $Z_i$. As noted above, according to an embodiment, initially, the matrix $Z_{i-1}$ ($Z_0$) is empty, so a first augmented matrix $Z_i$ (e.g., $Z_1$) will comprise a single column. In subsequent iterations, the process in step 4 will increase the number of columns by 1 for a current augmented matrix ($Z_{i-1}$ for a next iteration).

According to an embodiment, the augmented matrix $Z_i$ from step 4 is returned from the RPU array(s) 134 to the preconditioning control process 142 so that steps 5-10 can be performed digitally. In step 5, the equation $(Z_i^H A Z_i)y = Z_i^H b$ is solved for y, where y is a vector of weights to multiply the augmented matrix $Z_i$. In more detail, the conjugate transpose of the augmented matrix $Z_i$ ($Z_i^H$) is computed and is multiplied by the product of the matrix A and augmented matrix $Z_i$. The right-hand side of the equation in step 5 comprises the matrix-vector product of the conjugate transpose of the augmented matrix $Z_i$ ($Z_i^H$) and the vector b. In step 6, a matrix-vector product of the resulting weight vector y and the augmented matrix $Z_i$ is computed to yield the approximate solution $x_i$ for the $i^{th}$ iteration ($x_i = Z_i y$). Then, in step 7, the residual vector for the $i^{th}$ iteration is defined as $r_i = b - A x_i$. In steps 8-10, if the residual vector $r_i$ satisfies a convergence criterion or the maximum number of iterations $m_{it}$ has been reached, the process ends and the approximate solution $x_i$ is returned by the preconditioning control process 142 to the application 110. If the residual vector $r_i$ does not satisfy a convergence criterion and a maximum number of iterations $m_{it}$ has not been reached, the preconditioning control process 142 returns the current residual vector $r_i$ and augmented matrix $Z_i$ to the RPU array(s) 134 for a subsequent iteration starting with step 4, where the current residual vector becomes and the augmented matrix becomes $Z_{i-1}$ since i is increasing by 1. Steps 5-8 and possibly steps 9-10 are performed for the new values as described above. In connection with step 8, if the residual vector $r_{i-1}$ is less than or equal to the tolerance τ in units of $\|b\|$, then the convergence criterion is met.

The algorithm incorporating the steps 1-10 approximates $x \approx [Mr_0 \ldots Mr_i]y$, where $y \in R^{i+1}$ is determined by the condition $[Mr_0 \ldots Mr_i]^T (b-A)[Mr_0 \ldots Mr_i]y = 0$.

In accordance with exemplary embodiments of the disclosure, hardware accelerated computing is utilized (via, e.g., an RPU computing system) during an iteration process to perform the operations described in connection with step 4 of the above algorithm for each iteration of the iteration process. The iteration process computes an estimate of the solution x to the system $Ax=b$.

As schematically shown in FIG. 1, during the execution of the application 110, the application 110 may invoke the preconditioner application process 140 to enable the application of a preconditioning matrix M to a plurality of residual vectors to solve a linear system. As noted herein, the preconditioning matrix M is an approximate inverse of the matrix A, and is provided by the preconditioner generation process 144. In some embodiments, as noted herein, the matrix A comprises a non-singular sparse matrix.

In some embodiments, the digital processing system 120 controls the execution of preconditioner application process 140. As an initial step, upon receiving the matrices A and B from the application 110 along with a request to apply a preconditioner to solve the linear system $Ax=b$, the preconditioner application process 140 will configure one or more neural cores 132 and associated RPU arrays 134 of the neuromorphic computing system 130 to provide hardware acceleration support for the preconditioner application process 140. In addition, the preconditioner application process 140 will communicate with the neuromorphic computing system 130 to store the preconditioning matrix M in one or more RPU arrays 134 of the neural cores 132. The preconditioner application process 140 will invoke the preconditioner generation process 144 to compute an approximate inverse matrix $A^{-1}$ of the received matrix A, and store the inverse matrix $A^{-1}$ in one or more of the RPU arrays 134 of the one or more neural cores 132 which are configured to support the preconditioner application process 140. The preconditioning control process 142 performs portions of the iterative processing (e.g., steps 5-10 of the described algorithm), as needed to compute the approximate solutions $x_i$. Details of exemplary embodiments of preconditioner application methods will be discussed in further detail below.

Figure 2:
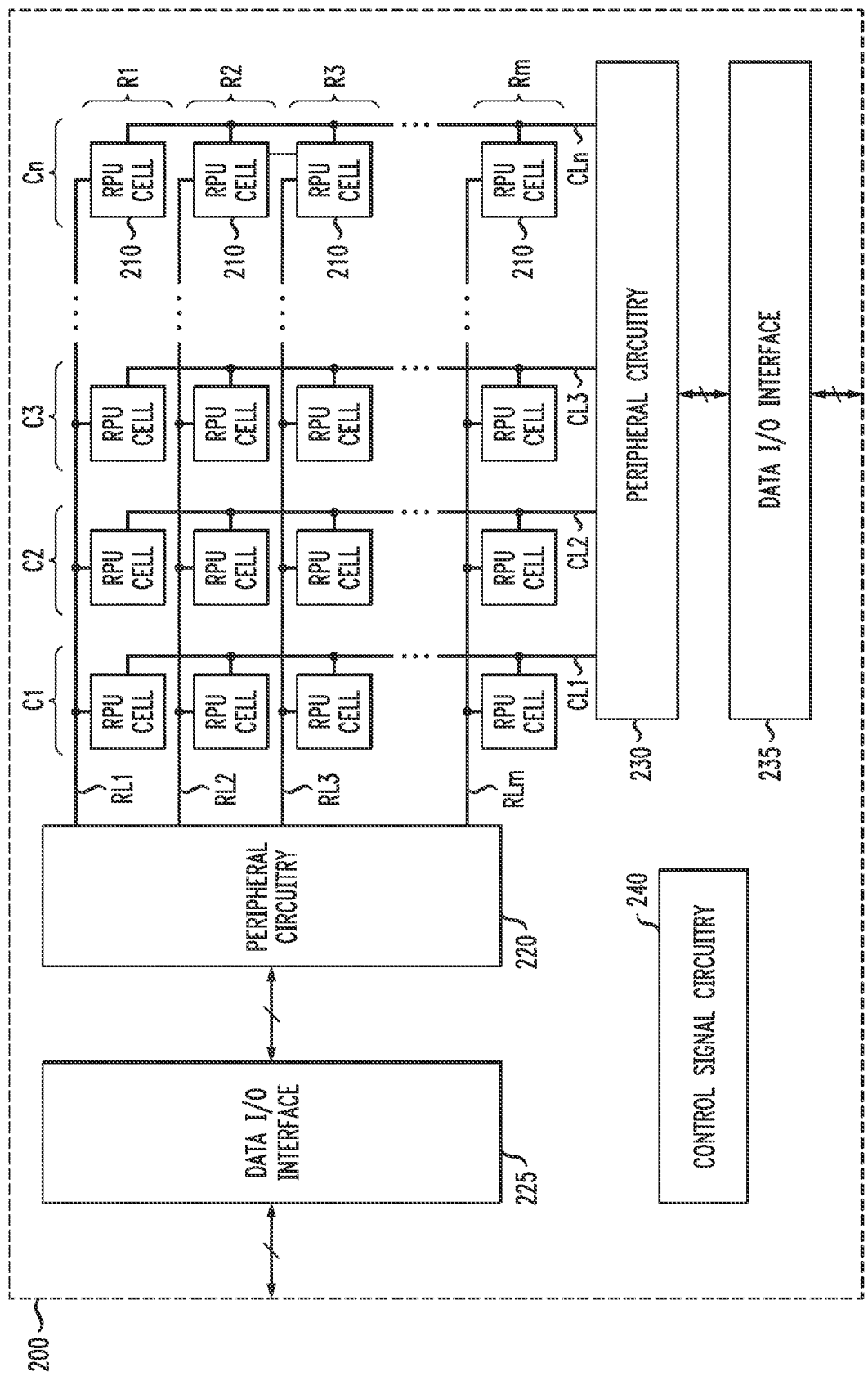
FIG. 2 schematically illustrates an RPU computing system which can be implemented in the system of FIG. 1 to provide hardware accelerated application of preconditioners to solve linear equations, according to an exemplary embodiment of the disclosure.

FIG. 2 schematically illustrates an RPU computing system which can be implemented in the system of FIG. 1 to provide hardware accelerated application of preconditioners to solve linear equations, according to an exemplary embodiment of the disclosure. For example, FIG. 2 schematically illustrates an exemplary embodiment of a neural core 132 and associated RPU array(s) 134 of the neuromorphic computing system 130 of FIG. 1. More specifically, FIG. 2 schematically illustrates an RPU computing system 200 (e.g., neuromorphic computing system) which comprises a two-dimensional (2D) crossbar array of RPU cells 210 arranged in a plurality of rows R1, R2, R3, . . . , Rm, and a plurality of columns C1, C2, C3, . . . , Cn. The RPU cells 210 in each row R1, R2, R3, . . . , Rm are commonly connected to respective row control lines RL1, RL2, RL3, . . . , RLm (collectively, row control lines RL). The RPU cells 210 in each column C1, C2, C3, . . . , Cn are commonly connected to respective column control lines CL1, CL2, CL3, . . . , CLn (collectively, column control lines CL). Each RPU cell 210 is connected at (and between) a cross-point (or intersection) of a respective one of the row and column control lines. In an exemplary embodiment, the number of rows (m) and the number of columns (n) are the same (i.e., n=m). For example, in some embodiments, the RPU computing system 200 comprises a 4,096×4,096 array of RPU cells 210.

The RPU computing system 200 further comprises peripheral circuitry 220 connected to the row control lines RL1, RL2, RL3, . . . , RLm, as well peripheral circuitry 230 connected to the column control lines CL1, CL2, CL3, . . . , CLn. Further, the peripheral circuitry 220 is connected to a data input/output (I/O) interface block 225, and the peripheral circuitry 230 is connected to a data I/O interface block 235. The RPU computing system 200 further comprises control signal circuitry 240 which comprises various types of circuit blocks such as power, clock, bias and timing circuitry to provide power distribution and control signals and clocking signals for operation of the peripheral circuitry 220 and 230 of the RPU computing system 200.

In some embodiments, each RPU cell 210 in the RPU computing system 200 comprises a resistive element with a conductance value that is tunable. During operation, some or all of the RPU cells 210 in the RPU computing system 200 comprise respective conductance values that are mapped to respective numerical matrix entries of a preconditioning matrix M that is stored in the array of RPU cells 210. In some embodiments, the resistive elements of the RPU cells 210 are implemented using resistive devices such as resistive switching devices (interfacial or filamentary switching devices), ReRAM, memristor devices, phase change memory (PCM) device, etc.) and other types of devices which have a tunable conductance (or tunable resistance level) which can be programmatically adjusted within a range of a plurality of different conductance levels to tune the weight of the RPU cell 210. In some embodiments, the variable conductance elements of the RPU cells 210 can be implemented using ferroelectric devices such as ferroelectric field-effect transistor devices. Furthermore, in some embodiments, the RPU cells 210 can be implemented using an analog CMOS-based framework in which each RPU cell 210 comprises a capacitor and a read transistor. With the analog CMOS-based framework, the capacitor serves as a memory element of the RPU cell 210 and stores a weight value in the form a capacitor voltage, and the capacitor voltage is applied to a gate terminal of the read transistor to modulate a channel resistance of the read transistor based on the level of the capacitor voltage, wherein the channel resistance of the read transistor represents the conductance of the RPU cell and is correlated to a level of a read current that is generated based on the channel resistance.

While the row control lines RL and column control lines CL are each shown in FIG. 2 as a single line for ease of illustration, it is to be understood that each row and column control line can include two or more control lines connected to the RPU cells 210 in the respective rows and columns, depending on the implementation and the specific architecture of the RPU cells 210. For example, in some embodiments, each row control line RL can include a complementary pair of word lines for a given RPU cell 210. Moreover, each column control line CL may comprise multiple control lines including, e.g., one or more source lines (SL) and one or more bit lines (BL).

The peripheral circuitry 220 and 230 comprises various circuit blocks which are connected to the respective rows and columns in the 2D array of RPU cells 210, and which are configured to perform various analog, in-memory computation operations such as vector-matrix multiply functions, matrix-vector multiply functions, and matrix augmentation operations, etc., to provide hardware accelerated application of preconditioners to solve linear equations, according to exemplary embodiments of the disclosure. For example, in some embodiments, to support RPU cell read/sensing operations (e.g., read a weight value of a given RPU cell 210), the peripheral circuitry 220 and 230 comprises pulse-width modulation (PWM) circuitry and read pulse driver circuitry, which is configured to generate and apply PWM read pulses to the RPU cells 210 in response to digital input vector values (read input values) received during different operations. More specifically, in some embodiments, the peripheral circuitry 220 and 230 comprises digital-to-analog (D/A) converter circuitry that is configured to receive a digital input vector (to be applied to rows or columns) and convert the elements of the digital input vector into analog input vector values that are represented by input voltage voltages of varying pulse width. In some embodiments, a time-encoding scheme is used when input vectors are represented by fixed amplitude Vin=1 V pulses with a tunable duration (e.g., pulse duration is a multiple of 1 ns and is proportional to the value of the input vector). The input voltages applied to rows (or columns) generate output vector values which are represented by output currents, wherein the stored weights/values of the RPU cells 210 are essentially read out by measuring the output currents.

The peripheral circuitry 220 and 230 further comprises current integrator circuitry and analog-to-digital (A/D) converter circuitry to integrate read currents ($I_{READ}$) which are output and accumulated from the connected RPU cells 210 and convert the integrated currents into digital values (read output values) for subsequent computation. In particular, the currents generated by the RPU cells 210 are summed on the columns (or rows) and the summed current is integrated over a measurement time, tmeas, by current readout circuitry of the peripheral circuitry 220 and 230. The current readout circuitry comprises current integrators and analog-to-digital (A/D) converters. In some embodiments, each current integrator comprises an operational amplifier that integrates the current output from a given column (or row) (or differential currents from pairs of RPU cells implementing negative and positive weights) on a capacitor, and an analog-to-digital (A/D) converter converts the integrated current (e.g., an analog value) to a digital value.

The data I/O interfaces 225 and 235 are configured to interface with a digital processing core, wherein the digital processing core is configured to process input/outputs to the RPU system 200 (e.g., neural core) and route data between different RPU arrays. The data I/O interfaces 225 and 235 are configured to (i) receive external control signals and data from a digital processing core and provide the received control signals and data to the peripheral circuitry 220 and 230, and (ii) receive digital read output values from peripheral circuitry 220 and 230, and send the digital read output values to a digital processing core for processing.

Figure 3:
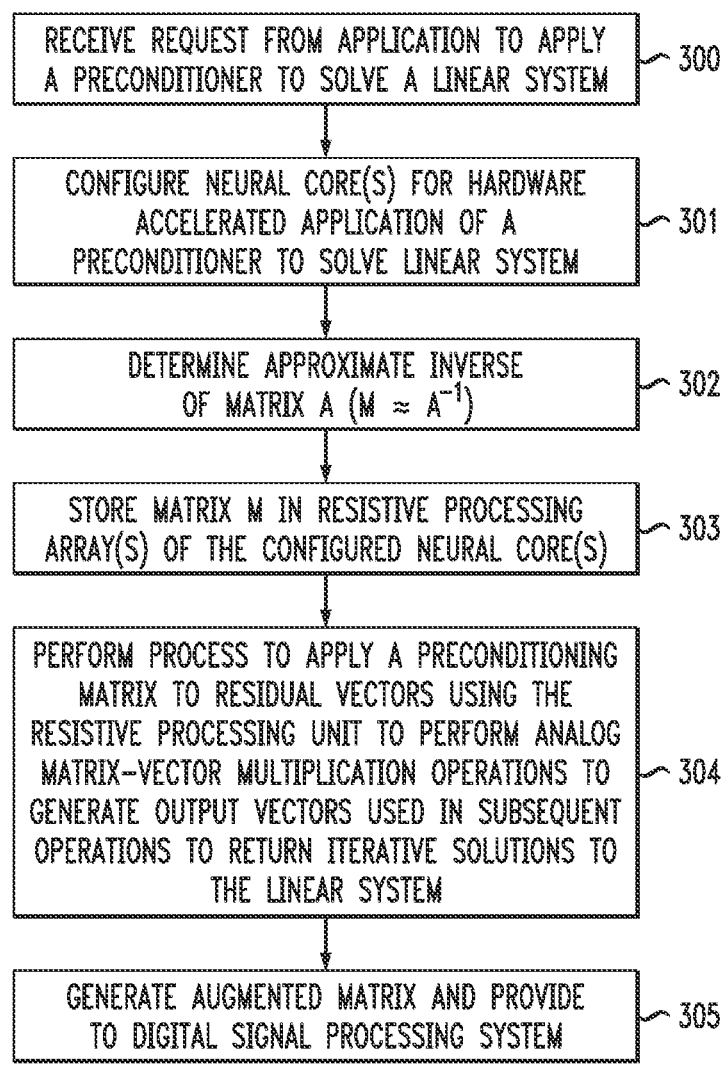
FIG. 3 illustrates a method for applying a preconditioning matrix to solve a linear system according to an exemplary embodiment of the disclosure.
Figure 4:
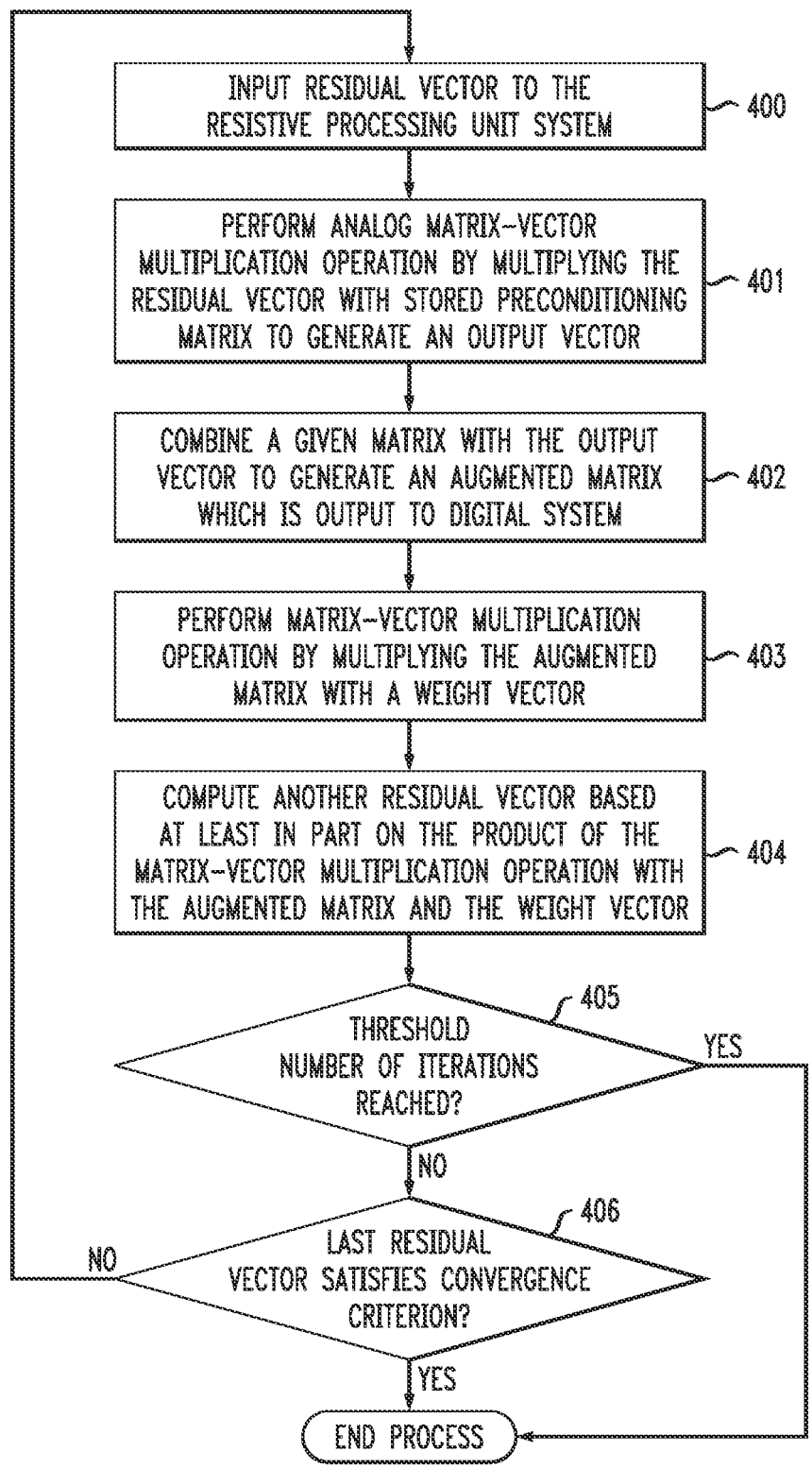
FIG. 4 illustrates an iterative process for computing a residual vector according to an exemplary embodiment of the disclosure.

FIG. 3 illustrates a method for applying a preconditioning matrix to solve a linear system, and FIG. 4 illustrates an iterative process for computing a residual vector according to exemplary embodiments of the disclosure. In particular, FIG. 3 illustrates a high-level process flow for applying a preconditioning matrix to solve a linear system which, in some embodiments, is implemented by the computing system 100 of FIG. 1. During run-time execution of a given application, the computing system 100 will receive a request from the given application to apply a preconditioner to solve a linear system (block 300). The request will include, for example, the entries of matrices A and B, as well as additional inputs including for example, the entries for the vector b (based on the matrix B), a tolerance τ, a maximum number of iterations $m_{it}$ and an initial factor vector $x_0$. In some embodiments, the matrix A comprises a non-singular matrix, e.g., n×n matrix, with n rows and n columns, where n can be relatively large (e.g., 100 or greater). In some embodiments, the non-singular matrix A comprises a sparse matrix. The computing system 100 invokes a preconditioner application process (e.g., process 140, FIG. 1) to apply a preconditioning matrix M in order to solve a linear system.

In some embodiments, the invocation of the preconditioner application process comprises an initial process of configuring the neuromorphic computing system 130 (e.g., RPU system) to perform hardware accelerated application of a preconditioner to solve a linear system (block 301). For example, in some embodiments, the digital processing system 120 communicates with a programming interface of the neuromorphic computing system 130 to configure one or more neurons and a routing system of the neuromorphic computing system 130 to allocate and configure one or more neural cores to (i) implement one or more interconnected RPU arrays for storing matrix entries of the preconditioning matrix M (e.g., estimated inverse matrix $A^{-1}$) and to (ii) perform in-memory computations (e.g., matrix-vector computations, etc.) using the stored matrix M, as will be discussed in further detail below.

In some embodiments, the number of RPU arrays that are allocated and interconnected will vary depending on the size of the matrix A and/or matrix M and the size of the RPU arrays. For example, if each RPU array has a size of 4096×4096, then one RPU array can be configured to store the entries of an estimated inverse matrix $A^{-1}$ of the matrix A, where n is 4096 or less. In some embodiments, when the preconditioning matrix M is smaller than a physical RPU on which the preconditioning matrix M is stored, any unused RPU cells can be set to zero and/or unused inputs to the RPU array can be padded by "zero" voltages. In some embodiments, when the size of the matrix M is greater than the size of a single RPU array, then multiple RPU arrays can be operatively interconnected to form an RPU array which is large enough to store the entries of the preconditioning matrix M (e.g., the estimated inverse matrix $A^{-1}$ of a given n×n matrix A).

Next, the digital processing system 120 will proceed perform a preconditioner generation process to determine an approximate inverse matrix $A^{-1}$ of the given matrix A (block 302) and then store the approximate inverse matrix $A^{-1}$ (i.e., preconditioning matrix M) on the allocated RPU array(s) of the configured neural core(s) (block 303). As noted above, the preconditioning matrix M is determined by operation of the preconditioner generation process 144 (FIG. 1). In some embodiments, the matrix inversion process performs a Neuman series process, an incomplete LU factorization process, a Newton iteration process or other matrix inversion process in the preconditioner generation process 144 utilizes the hardware accelerated matrix inversion computing techniques as disclosed in U.S. patent application Ser. No. 17/134,814.

Once the matrix M has been stored in the RPU array(s), a preconditioner application process is performed to apply the preconditioning matrix to residual vectors (block 304) wherein the preconditioner application process comprises utilizing the RPU system to perform various hardware computations on the stored matrix such as, e.g., matrix-vector computations to generate output vectors used in subsequent operations (e.g., matrix augmentation processes, etc.) to return iterative solutions to a linear system. For example, referring to block 305, a matrix augmentation process is performed to augment existing matrices (e.g., matrices Z discussed herein above). The augmented matrices are provided to the digital processing system 120 for further operations as discussed in connection with steps 5-10 of the above algorithm. In some embodiments, the preconditioner application process is implemented using the exemplary process flow and computations as discussed in further detail below in conjunction with FIGS. 4, 5 and 6.

Referring now to FIG. 4, an exemplary an iterative process for computing a residual vector is shown, according to an exemplary embodiment of the disclosure. For illustrative purposes, the process flow of FIG. 4 will be discussed in the context of performing an iteration process under circumstances in which the preconditioning matrix M is stored in the RPU array. Referring to block 400, a residual vector r (e.g., r=b−Ax) is input to the RPU system. If the iteration is an initial iteration, the residual vector r is represented as $r_0$=b−$Ax_o$. If the iteration is after an initial iteration, the residual vector r is represented as $r_i$=b−$Ax_i$.

Next, referring to block 401, an analog matrix-vector multiplication operation is performed by the RPU system by multiplying the residual vector from block 400 with the stored preconditioning matrix M to generate an output vector. Then, at block 402, a given matrix is combined with the output vector to generate an augmented matrix which is output to the digital processing system 120. In more detail, the matrix-vector multiplication operation yields a product of the preconditioning matrix M and a given or previous residual vector to generate a column vector, which is combined with the matrix 14 to generate an augmented matrix L.

Referring to blocks 403 and 404, the digital processing system 120 performs a matrix-vector multiplication operation by multiplying the augmented matrix $Z_i$ with a weight vector y, and computes another residual vector $r_i$ based at least in part on the product $x_i$ of the matrix-vector multiplication operation with the augmented matrix $Z_i$ and the weight vector y. In more detail, in response to receiving the augmented matrix $Z_i$ from the RPU array(s) 134, the digital processing system 120 solves the equation $(Z_i^H A Z_i)y = Z_i^H b$ for y, and computes the matrix-vector product of the resulting weight vector y and the augmented matrix $Z_i$ to yield the approximate solution $x_i$ for the $i^{th}$ iteration ($x_i = Z_i y$). The residual vector for the $i^{th}$ iteration is defined as $r_i$=b−$Ax_i$.

Following step 404, at block 405, a determination is made whether a threshold number of iterations ($m_{it}$) has been reached. If yes at block 405, the process ends and the approximate solution $x_i$ is returned to the application 110. If no at block 405, at block 406, a determination is made whether the residual vector for the $i^{th}$ iteration (e.g., last determined residual vector) satisfies a convergence criterion. If yes at block 406, the process ends and the approximate solution $x_i$ is returned to the application 110. If no at block 406, the process returns to step 400, where the residual vector for the $i^{th}$ iteration (e.g., last determined residual vector) is input to the RPU system so that another iteration of steps 400-406 can be performed until a maximum (e.g., user-defined) number of iterations ($m_{it}$) is performed and/or a determined residual vector satisfies a convergence criterion.

In some embodiments, a determination is made as to whether the system should check for convergence. For example, the determination can made based on the number of iterations of the iteration process which have been performed following a previous convergence check operation. For example, in some embodiments, a convergence check operation can be performed for every p iterations of the iteration process, wherein p can be 1, 2, 3, 4, 5, etc. In some embodiments, an initial convergence check operation can be performed following the first p iterations (e.g., p=5), wherein a convergence check operation is then performed after each iteration of the iteration process until a convergence criterion has been met. In some embodiments, the convergence check operation comprises determining an error between a current normalized vector and the previous (last) normalized vector and determining whether the error exceeds an error threshold value.

Figure 5:
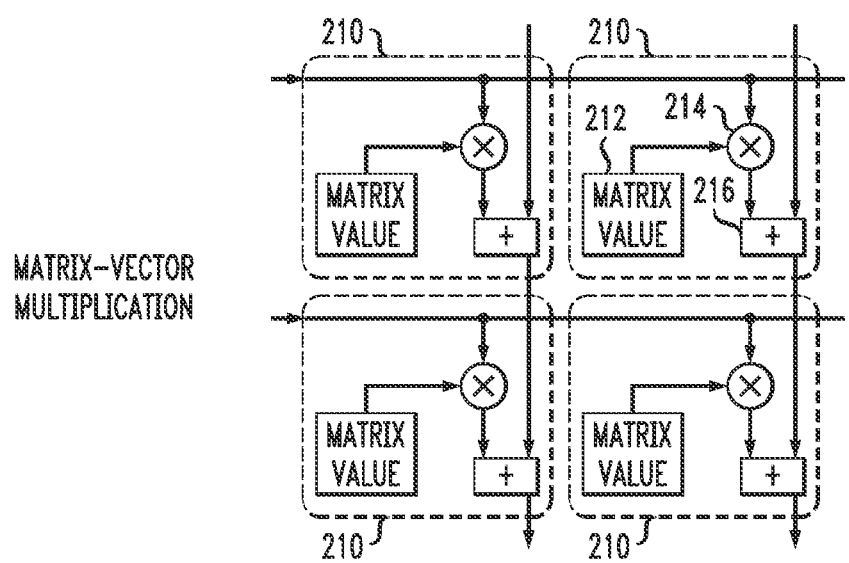
FIG. 5 schematically illustrates a method for performing an analog matrix-vector multiplication operation by an RPU computing system comprising an array of RPU cells to implement hardware accelerated application of preconditioners to solve linear equations, according to an exemplary embodiment of the disclosure.

FIG. 5 schematically illustrates a method 500 for performing an analog matrix-vector multiplication operation by an RPU computing system comprising an array of RPU cells to implement hardware accelerated application of preconditioners to solve linear equations. In some embodiments, FIG. 5 schematically illustrates a matrix-vector multiplication operation (e.g., $Mr_{i-1}$) that is performed on matrix entries 212 of a matrix which is stored on an array of RPU cells 210 of the RPU computing system 200 of FIG. 2. The conductance values of the RPU cells 210 are mapped to respective matrix entries 212 of a matrix (e.g., matrix M) that is stored in the array of RPU cells 210, and the matrix entries 212 stored in the RPU cells 210 are encoded by the respective conductance values of the RPU cells 210. According to an embodiment, each RPU cell 210 performs a local multiplication operation 214 and a local summation operation 216 to perform an analog matrix-vector multiplication operation (e.g., block 401, FIG. 4).

Figure 6:
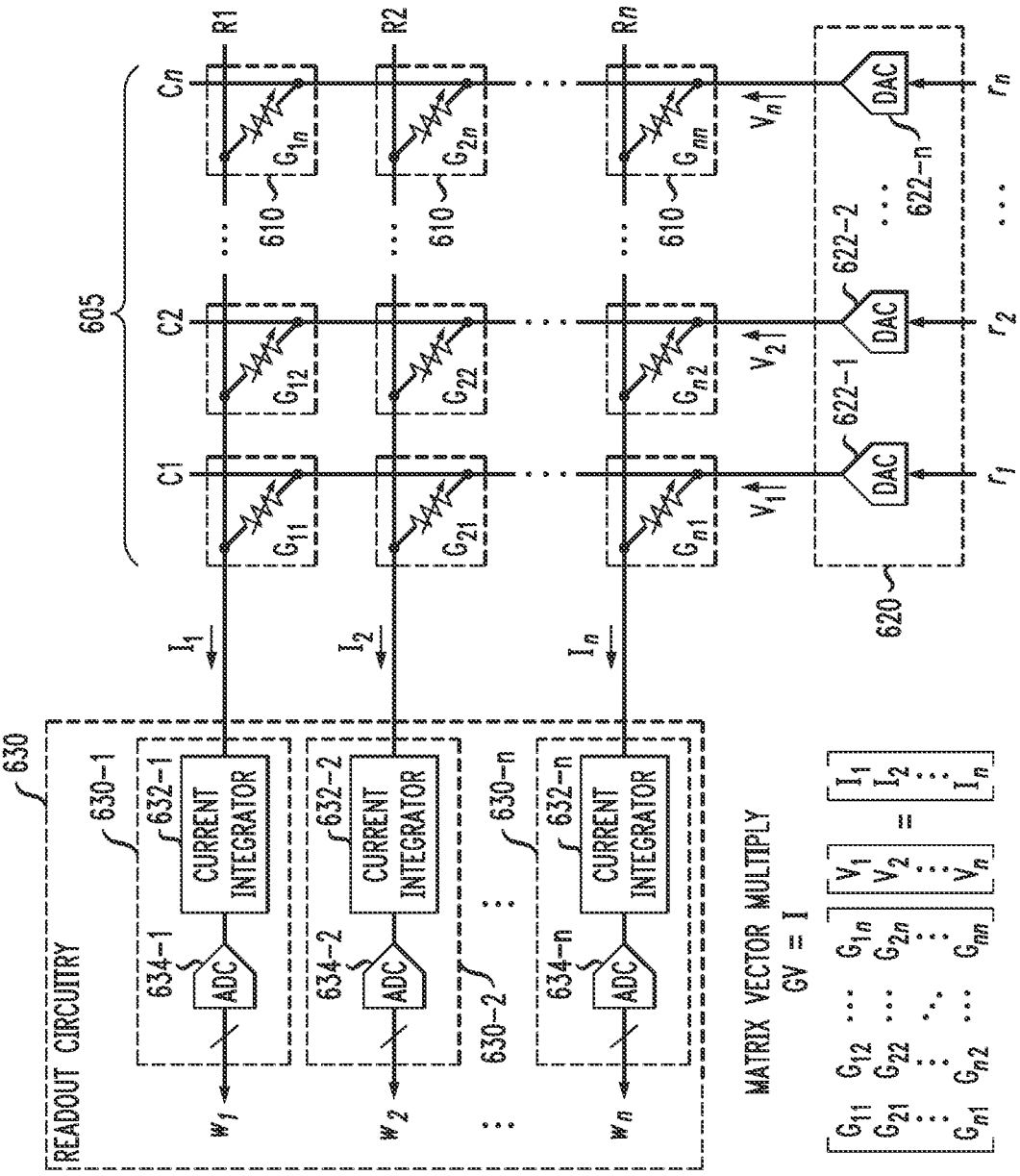
FIG. 6 schematically illustrates a method for configuring an RPU computing system comprising an array of RPU cells to perform a matrix-vector multiplication operation to implement hardware accelerated application of preconditioners to solve linear equations, according to an exemplary embodiment of the disclosure.

FIG. 6 schematically illustrates a method for configuring an RPU computing system comprising an array of RPU cells to perform a matrix-vector multiplication operation to implement hardware accelerated application of preconditioners to solve linear equations, according to an exemplary embodiment of the disclosure. In particular, FIG. 6 schematically illustrates an RPU computing system which comprises a crossbar array of RPU cells 605 (or RPU array 605), wherein each RPU cell 610 in the RPU array 605 comprises an analog non-volatile resistive element (represented as a variable resistor having a tunable conductance G) at the intersection of each row (R1, R2, ..., Rn) and column (C1, C2, ..., Cn). As depicted in FIG. 6, the array of RPU cells 605 provides a matrix of conductance values $G_{jk}$ which are mapped to matrix entries of a matrix M, which are encoded by the conductance values $G_{jk}$ (where j represents a row index and k denotes a column index) of the respective RPU cells 610. In an exemplary embodiment, the matrix M is stored in the RPU array 605 wherein the $j^{th}$ row of RPU cells represents the $j^{th}$ row of the matrix M, and wherein the $k^{th}$ column of RPU cells represents the $k^{th}$ column of the matrix M.

To perform a matrix-vector multiplication process for iteration process (e.g., block 401, FIG. 4), multiplexers in the peripheral circuitry of the computing system are activated to selectively connect column line driver circuitry 620 to the column lines C1, C2, ..., Cn. The column line driver circuitry 620 comprises plurality of digital-to-analog (DAC) circuit blocks 622-1, 622-2, ..., 622-n (collectively DAC circuit blocks 622) which are connected to respective column lines C1, C2, ..., Cn. In addition, multiplexers in the peripheral circuitry of the computing system are activated to selectively connect readout circuitry 630 to the row lines R1, R2, ..., Rn. The readout circuitry 630 comprises a plurality of readout circuit blocks 630-1, 630-2, ..., 630-n, which are connected to respective row lines R1, R2, ..., Rn. The readout circuit blocks 630-1, 630-2, ..., 630-n comprise respective current integrator circuitry 632-1, 632-2, ..., 632-n, and respective analog-to-digital (ADC) circuitry 634-1, 634-2, ..., 634-n. The current integrator circuitry comprises current integrator circuit blocks, wherein each current integrator comprises an operational transconductance amplifier (OTA) with negative capacitive feedback to convert an input current (aggregate column current) to an output voltage on output node of the current integrator circuit, wherein at the end of an integration period, each ADC circuit latches in the output voltage generated at an output node of a respective current integrator circuit quantizes the output voltage to generate a digital output signal. of the RPU array 605. The digital signals $r_1, r_2, ..., r_n$ are input to respective DAC circuit blocks 622-1, 622-2, ..., 622-m which generate analog voltages $V_1, V_2, ..., V_n$ at the input to the respective column lines C1, C2, ..., Cn, which are proportional to the input vector values $r_1, r_2, ..., r_n$ respectively. In some embodiments, the DAC circuit blocks 622-1, 622-2, ..., 622-n each comprise pulse-width modulation circuitry and driver circuitry which is configured to generate pulse-width modulated (PWM) read pulses $V_1, V_2, ..., V_n$ that are applied to the respective column lines C1, C2, ..., Cn.

More specifically, in some embodiments, the DAC circuit blocks 622-1, 622-2, ..., 622-n are configured to perform a digital-to-analog conversion process using a time-encoding scheme where the input vectors are represented by fixed amplitude pulses (e.g., V=1V) with a tunable duration, wherein the pulse duration is a multiple of a prespecified time period (e.g., 1 nanosecond) and is proportional to the value of the input vector. For example, a given digital input value of 0.5 can be represented by a voltage pulse of 4 ns, while a digital input value of 1 can be represented by a voltage pulse of 80 ns (e.g., a digital input value of 1 can be encoded to an analog voltage pulse with a pulse duration that is equal to the integration time $T_{meas}$). As shown in FIG. 6, the resulting analog input voltages $V_1, V_2, ..., V_n$ (e.g., read pulses), are applied to the array of RPU cells 605 via the column lines C1, C2, ..., Cn.

To perform a matrix-vector multiplication, the analog input voltages $V_1, V_2, ..., V_n$ (e.g., read pulses), are applied to the column lines C1, C2, Cn, wherein each RPU cell 610 generates a corresponding read current $I_{READ}=V_k \times G_{jk}$ (based on Ohm's law), wherein $V_k$ denotes the analog input voltage applied to the given RPU cell 610 on the given column k and wherein $G_{jk}$ denotes the conductance value of the given RPU cell 610 (at the given row j and column k). As shown in FIG. 6, the read currents that are generated by the RPU cells 610 on each row j are summed together (based on Kirchhoff's current law) to generate respective currents $I_1, I_2, ..., I_n$ at the output of the respective rows R1, R2, ..., Rn. In this manner, the resulting row currents $I_1, I_2, ..., I_n$ represent the result of a matrix-vector multiplication operation that is performed, wherein the matrix M (which is represented by the conductance matrix G of conductance values $G_{jk}$) is multiplied by the input analog voltage vector $[V_1, V_2, ..., V_n]$ to generate and output an analog current vector $[I_1, I_2, ..., I_n]$, as illustrated in FIG. 6. In particular, a given row current $I_i$ is computed as $I_i=\Sigma_{k=1}^n V_k G_{jk}$. For example, the row current $I_1$ for the first row R1 is determined as $I_1=(V_1G_{11}+V_2G_{12}+, ..., +V_nG_{1n})$.

The resulting aggregate read currents $I_1, I_2, ..., I_n$ at the output of the respective rows R1, R2, Rn are input to respective readout circuit blocks 630-1, 630-2, ..., 630-n of the readout circuitry 630. The aggregate read currents $I_1, I_2, ..., I_n$ are integrated by the respective current integrator circuits 632-1, 632-2, ..., 632-n to generate respective output voltages, which are quantized by the respective ADC circuits 634-1, 634-2, ..., 634-n to generate respective digital output signals $w_1, w_2, ..., w_n$ of an output vector w, which is generated as a result of the matrix-vector multiplication of the preconditioning matrix M with the input residual vectors $r_1, r_2, ..., r_n$.

The exemplary embodiment of FIG. 6 schematically illustrates a process for performing a matrix-vector multiplication operation ($Mr_i$) wherein (i) the matrix M is stored in the RPU array 605 such that the $j^{th}$ row of RPU cells represents the $j^{th}$ row of the matrix M, and the $k^{th}$ column of RPU cells represents the $k^{th}$ column of the matrix M, (ii) the vector r is input to the columns, and (iii) the resulting vector w is generated at the output of the rows.

According to one or more embodiments, the preconditioning matrix M need only approximate $A^{-1}$ up to the write noise of the analog crossbar array. In an ideal situation, $\|I-MA\|$ is as small as possible (the minimum is achieved when $M=A^{-1}$). According to the embodiments, since the matrix M is written in an analog crossbar array, a highly accurate approximation of $A^{-1}$ by matrix M does not provide more efficiency. Effectively, the preconditioning matrix M written in the analog crossbar array behaves as $\hat{M}=M+0(\in)$, where $\in \in R$ is a random write noise whose modulus depends on hardware (e.g., $\in=0.06$). The effective preconditioner $\hat{M}$ satisfies $\hat{M}A=MA+0 (\in)A$ such that even if $M=A^{-1}$, the preconditioned coefficient matrix is equal to $\hat{M}A=I+0(\in)A$. As a result, the embodiments drop all entries for the preconditioning matrix M which are less than the write noise $\in$. If the entries were not dropped, the corresponding vectors from the matrix-vector multiplication operation would be dominated by noise. In other words, all entries in the preconditioning matrix M which are smaller than the write noise are zeroed. Advantageously, the embodiments identify an upper limit of the write noise and damp to zero all entries for the matrix M which are below the upper limit.

Figure 7B:
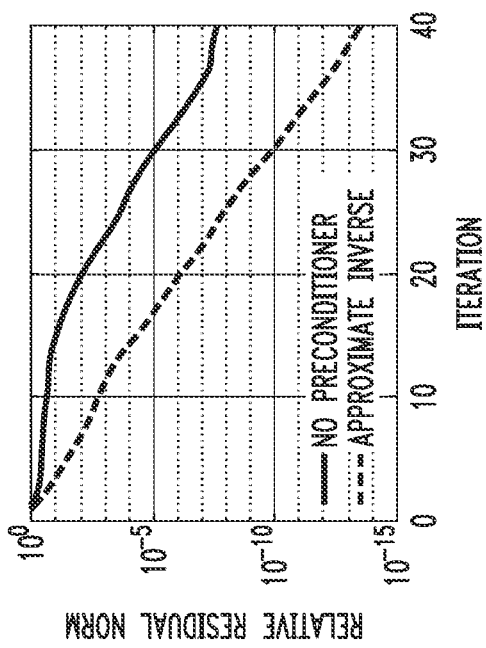
FIGS. 7A and 7B depict graphs of relative residual norm with respect to the number of iterations when there is no preconditioning matrix and when using an approximate inverse preconditioning matrix, according to an exemplary embodiment of the disclosure.
Figure 7A:
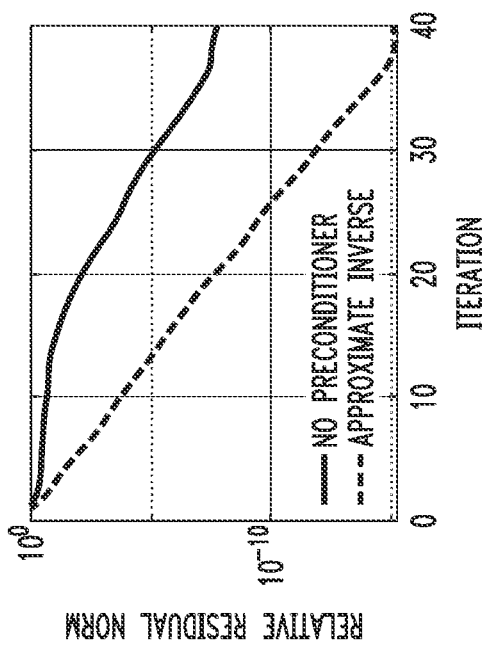

Referring to FIGS. 7A and 7B, the graphs 701 and 702 illustrate relative residual norm with respect to the number of iterations when there is no preconditioning matrix and when using an approximate inverse preconditioning matrix M. The generated approximate inverse preconditioner matrices M have zeroed all entries which are below a write noise. In graph 701, input and output noise are respectively 1% and 6%, and in the right graph 702, input and output noise are respectively 1% and 2%. The input matrix A in FIGS. 7A and 7B of which the approximate inverse is generated represents a discretization of a convection-diffusion operator.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
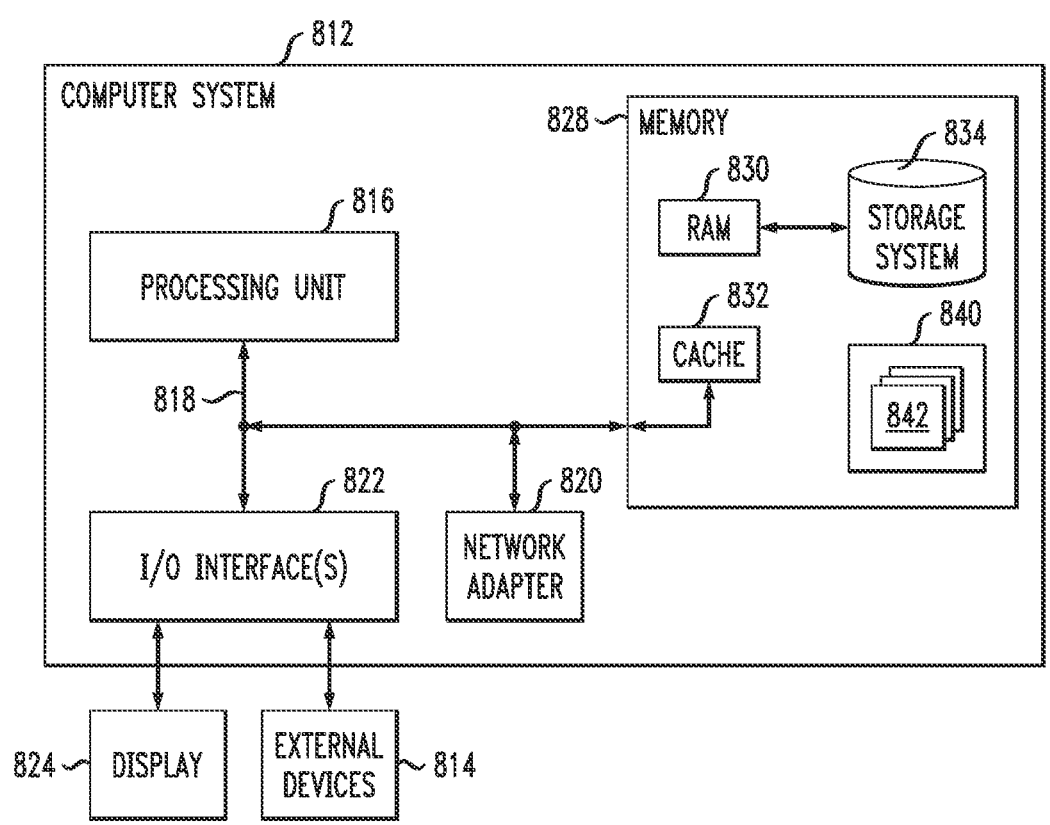
FIG. 8 schematically illustrates an exemplary architecture of a computing node which can host a system that is configured to execute a preconditioner application process according to an exemplary embodiment of the disclosure.

These concepts are illustrated with reference to FIG. 8, which schematically illustrates an exemplary architecture of a computing node that can host a system which is configured to execute a preconditioner generation and application process, according to an exemplary embodiment of the disclosure. FIG. 8 illustrates a computing node 800 which comprises a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

In FIG. 8, computer system/server 812 in computing node 800 is shown in the form of a general-purpose computing device. The components of computer system/server 812 may include, but are not limited to, one or more processors or processing units 816, a system memory 828, and a bus 818 that couples various system components including system memory 828 to the processors 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random-access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As depicted and described herein, memory 828 may include at least one program product having a set (e.g., at least one) of program modules that are configured to carry out the functions of embodiments of the invention.

The program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the disclosure as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
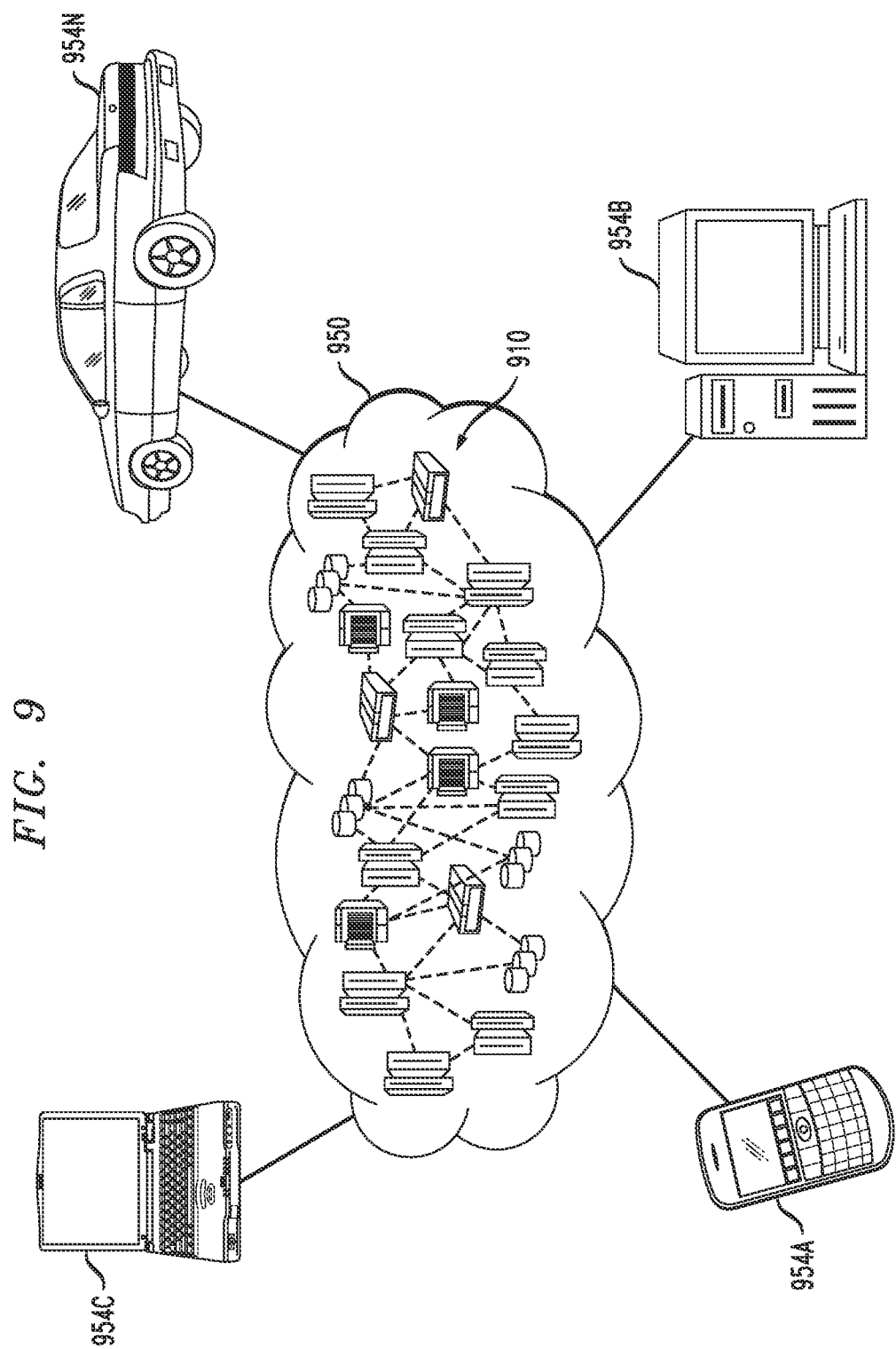
FIG. 9 depicts a cloud computing environment according to an exemplary embodiment of the disclosure.

Referring now to FIG. 9, illustrative cloud computing environment 910 is depicted. As shown, cloud computing environment 910 includes one or more cloud computing nodes 950 with which local computing devices used by cloud consumers, such as, for example, personal digital assistant (PDA) or cellular telephone 954A, desktop computer 954B, laptop computer 954C, and/or automobile computer system 954N may communicate. Cloud computing nodes 950 may communicate with one another. They may be grouped (not shown) physically or virtually, in one or more networks, such as Private, Community, Public, or Hybrid clouds as described hereinabove, or a combination thereof. This allows cloud computing environment 910 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 950 and cloud computing environment 910 can communicate with any type of computerized device over any type of network and/or network addressable connection (e.g., using a web browser).

Figure 10:
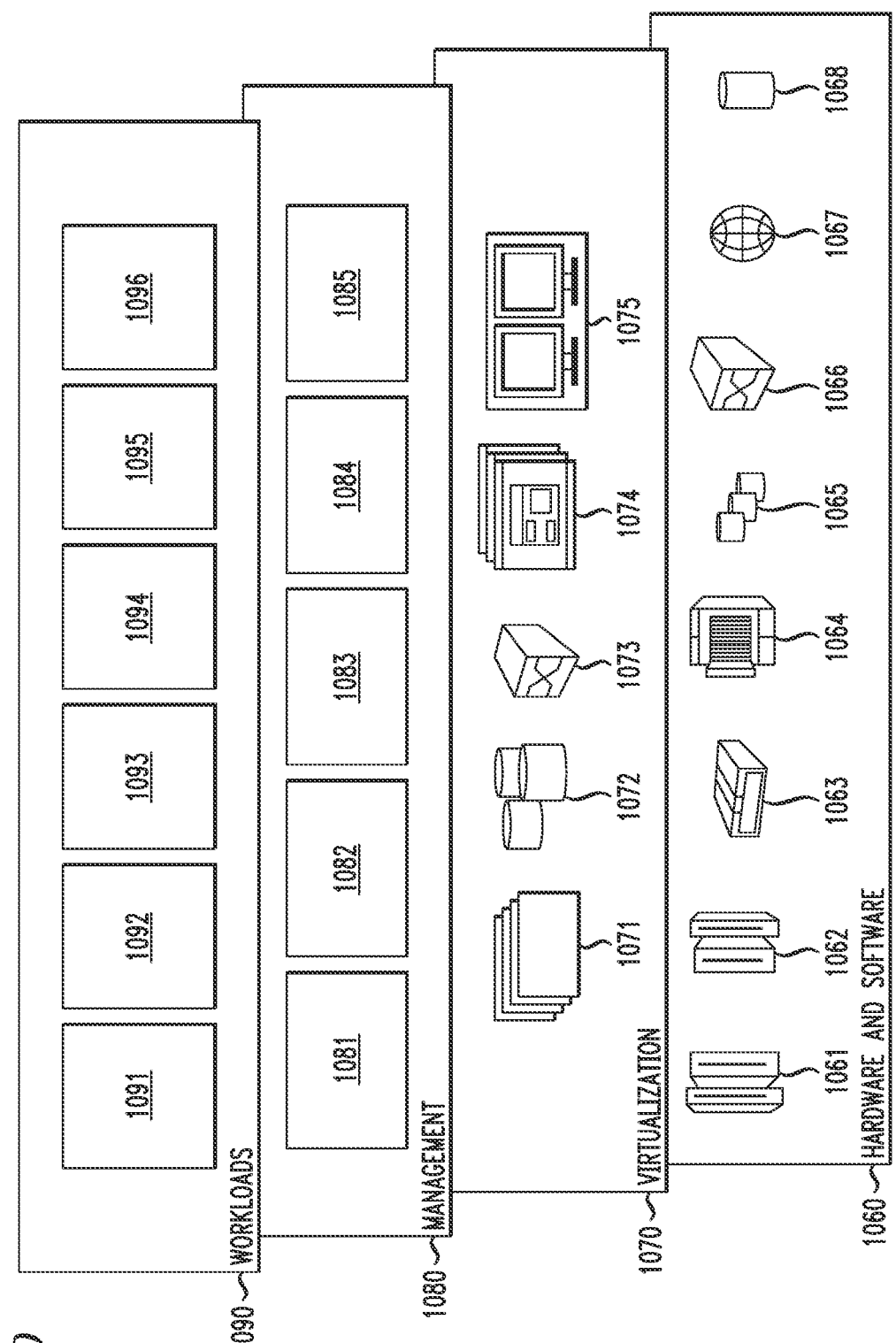
FIG. 10 depicts abstraction model layers according to an exemplary embodiment of the disclosure.

Referring now to FIG. 10, a set of functional abstraction layers provided by cloud computing environment 910 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and various functions 1096 for performing operations such as application and generation of preconditioner matrices, performing matrix operations, performing matrix decomposition operations, using an RPU system with RPU arrays to provide hardware accelerated computing and analog in-memory computations based on the exemplary methods and functions discussed above in conjunction with, e.g., FIGS. 3 and 4. Furthermore, in some embodiments, the hardware and software layer 1060 would include the computing system 100 of FIG. 1 to implement or otherwise support the various workloads and functions 1096 for performing such hardware accelerated computing and analog in-memory computations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor; and
    a resistive processing unit coupled to the processor, the resistive processing unit comprising an array of cells, the cells respectively comprising resistive devices, a least a portion of the resistive devices being tunable to encode entries of a preconditioning matrix storable in the array of cells;
    wherein, when the preconditioning matrix is stored in the array of cells, the processor is configured to apply the preconditioning matrix to a plurality of residual vectors by executing a process which comprises performing analog matrix-vector multiplication operations on the preconditioning matrix and respective ones of the plurality of residual vectors to generate a plurality of output vectors used in one or more subsequent operations,
    wherein in a first iteration of at least a portion of the process, the processor is configured to:
        input a first residual vector of the plurality of residual vectors to the array of cells;
        utilize the resistive processing unit to perform a first matrix-vector multiplication operation by multiplying the first residual vector with the preconditioning matrix in the array of cells to generate a first output vector of the plurality of output vectors;
        combine a given matrix with the first output vector to generate a first augmented matrix which is output from the array of cells;
        perform a second matrix-vector multiplication operation; and
        compute a second residual vector of the plurality of residual vectors based at least in part on the product of the second matrix-vector multiplication operation.

2. The system of claim 1, wherein the first output vector comprises a column vector.

3. The system of claim 1, wherein in executing the process, the processor is further configured to:
    compute a conjugate transpose of the first augmented matrix; and
    compute a weight vector based at least in part on the conjugate transpose.

4. The system of claim 3, wherein in executing the process, the processor is configured to compute a matrix-vector product of the first augmented matrix and the weight vector, wherein the matrix-vector product comprises one of a plurality of iterative solutions to a linear system.

5. The system of claim 1, wherein in executing the process, the processor is configured to:
    estimate an inverse matrix of a designated matrix; and
    store the estimated inverse matrix as the preconditioning matrix in the array of cells.

6. The system of claim 5, wherein:
    the plurality of output vectors are used in the one or more subsequent operations to return a plurality of iterative solutions to a linear system; and
    the linear system corresponds to the equation $Ax=b$, wherein A is the designated matrix, b is a right-hand side vector, and x is a variable vector corresponding to a given one of the plurality of iterative solutions.

7. The system of claim 1, wherein
    the second matrix-vector multiplication operation comprises multiplying the first augmented matrix with a first weight vector.

8. The system of claim 1, wherein in a second iteration of at least a portion of the process, the processor is configured to:
    input the second residual vector to the array of cells;
    utilize the resistive processing unit to perform a third matrix-vector multiplication operation by multiplying the second residual vector with the preconditioning matrix in the array of cells to generate a second output vector of the plurality of output vectors;
    combine the first augmented matrix with the second output vector to generate a second augmented matrix which is output from the array of cells;
    perform a fourth matrix-vector multiplication operation by multiplying the second augmented matrix with a second weight vector; and
    compute a third residual vector of the plurality of residual vectors based at least in part on the product of the fourth matrix-vector multiplication operation.

9. The system of claim 8, wherein:
    the plurality of output vectors are used in the one or more subsequent operations to return a plurality of iterative solutions to a linear system;
    the linear system corresponds to the equation $Ax=b$, wherein A is a left-hand side matrix, b is a right-hand side vector, and x is a variable vector corresponding to a given one of the plurality of iterative solutions; and
    the first, second and third residual vectors correspond to the equation $r=b-Ax$.

10. The system of claim 8, wherein upon completing a plurality of iterations of the process, the processor is configured to one of:

determine whether the plurality of iterations corresponds to a threshold number of iterations; and determine whether a last residual vector computed from a last completed iteration of the plurality of iterations satisfies a given convergence criterion.

11. A computer program product, comprising:

one or more computer readable storage media, and program instructions collectively stored on the one or more computer readable storage media, the program instructions comprising:

program instructions to receive a preconditioning matrix from an application;

program instructions to store the preconditioning matrix in an array of cells of a resistive processing unit; and program instructions to execute a process to apply the preconditioning matrix to a plurality of residual vectors, wherein the program instructions to execute the process comprise program instructions to perform analog matrix-vector multiplication operations on the preconditioning matrix and respective ones of the plurality of residual vectors to generate a plurality of output vectors used in one or more subsequent operations;

wherein the program instructions to execute the process further comprise program instructions to perform a first iteration, which comprises:

inputting a first residual vector of the plurality of residual vectors to the array of cells;

utilizing the resistive processing unit to perform a first matrix-vector multiplication operation by multiplying the first residual vector with the preconditioning matrix in the array of cells to generate a first output vector of the plurality of output vectors;

combining a given matrix with the first output vector to generate a first augmented matrix which is output from the array of cells;

performing a second matrix-vector multiplication operation; and computing a second residual vector of the plurality of residual vectors based at least in part on the product of the second matrix-vector multiplication operation.

12. The computer program product of claim 11, wherein the first output vector comprises a column vector.

13. The computer program product of claim 11, wherein the program instructions to execute the process further comprise:

program instructions to compute a conjugate transpose of the first augmented matrix; and program instructions to compute a weight vector based at least in part on the conjugate transpose.

14. The computer program product of claim 13, wherein the program instructions to execute the process further comprise program instructions to compute a matrix-vector product of the first augmented matrix and the weight vector, wherein the matrix-vector product comprises one of a plurality of iterative solutions to a linear system.

15. The computer program product of claim 11, wherein the the second matrix-vector multiplication operation comprises multiplying the first augmented matrix with a first weight vector.

16. The computer program product of claim 11, wherein the program instructions to execute the process further comprise program instructions to perform at least a second iteration which comprises:

inputting the second residual vector to the array of cells;

utilizing the resistive processing unit to perform a third matrix-vector multiplication operation by multiplying the second residual vector with the preconditioning matrix in the array of cells to generate a second output vector of the plurality of output vectors;

combining the first augmented matrix with the second output vector to generate a second augmented matrix which is output from the array of cells;

performing a fourth matrix-vector multiplication operation by multiplying the second augmented matrix with a second weight vector; and computing a third residual vector of the plurality of residual vectors based at least in part on the product of the fourth matrix-vector multiplication operation.

17. A method comprising:

receiving a preconditioning matrix from an application;

storing the preconditioning matrix in an array of cells of a resistive processing unit; and executing a process to apply the preconditioning matrix to a plurality of residual vectors, wherein the executing the process comprises performing analog matrix-vector multiplication operations on the preconditioning matrix and respective ones of the plurality of residual vectors to generate a plurality of output vectors used in one or more subsequent operations;

wherein a first iteration of at least a portion of the process comprises:

inputting a first residual vector of the plurality of residual vectors to the array of cells;

utilizing the resistive processing unit to perform a first matrix-vector multiplication operation by multiplying the first residual vector with the preconditioning matrix in the array of cells to generate a first output vector of the plurality of output vectors;

combining a given matrix with the first output vector to generate a first augmented matrix which is output from the array of cells;

performing a second matrix-vector multiplication operation; and computing a second residual vector of the plurality of residual vectors based at least in part on the product of the second matrix-vector multiplication operation.

18. The method of claim 17, wherein the first output vector comprises a column vector.

19. The method of claim 17, wherein executing the process further comprises:

computing a conjugate transpose of the first augmented matrix; and computing a weight vector based at least in part on the conjugate transpose.

20. The method of claim 19, wherein executing the process further comprises computing a matrix-vector product of the first augmented matrix and the weight vector, wherein the matrix-vector product comprises one of a plurality of iterative solutions to a linear system.

* * * * *